L. H. PIEPER.

CHEESE FOLLOWER.

APPLICATION FILED DEC. 13, 1915.

Reissued Jan. 11, 1916. 14,048.

Witness:

Inventor:

Louis H. Pieper

By Geo. W. Young

Attorney

UNITED STATES PATENT OFFICE.

LOUIS H. PIEPER, OF PLYMOUTH, WISCONSIN.

CHEESE-FOLLOWER.

14,048. Specification of Reissued Letters Patent. Reissued Jan. 11, 1916.

Original No. 1,158,276, dated October 26, 1915, Serial No. 868,636. Application for reissue filed December 13, 1915. Serial No. 66,638.

*To all whom it may concern:*

Be it known that I, LOUIS H. PIEPER, a citizen of the United States, residing at Plymouth, in the county of Sheboygan and State of Wisconsin, have invented a new and useful Cheese-Follower, of which the following is a specification.

This invention relates to cheese followers, and one of the principal objects thereof is to provide an improved and simplified follower constructed of a single sheet or piece of metal, and one which will be extremely sanitary, and efficient in operation.

Another object of the invention is to provide a follower which is adapted to be associated in spaced relation with the bottom of a respective hoop of a gang press whereby a drainage chamber is formed between said bottom and the follower to provide for drainage both from the mouth end of one hoop and the butt end of the adjacent hoop, the means for holding the follower and bottom spaced apart also serving to strengthen both members whereby a maximum thinness of both members may be procured with the consequent advantage of reducing the width of the drainage openings to eliminate possible clogging thereof due to retention of grease or other matter therein.

With these and other objects in view which will become apparent as the description proceeds, the invention resides in the construction, combination and arrangement of parts, hereinafter more fully described and claimed, and illustrated in the accompanying drawings, in which like characters of reference indicate like parts throughout the several figures, of which—

Figure 2:
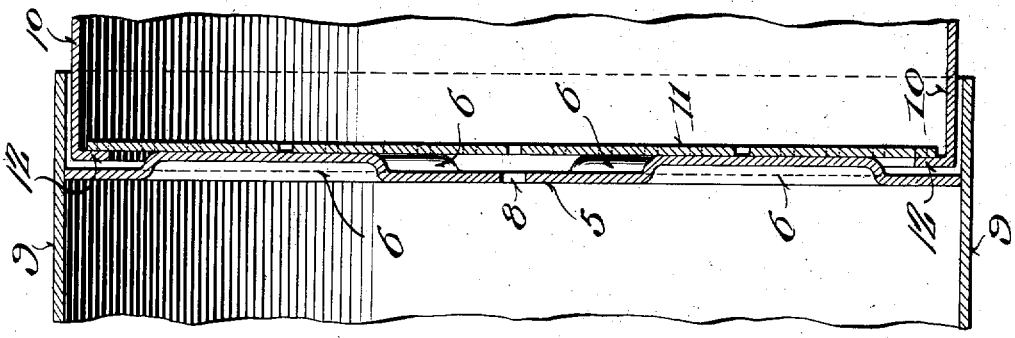
Figure 1:
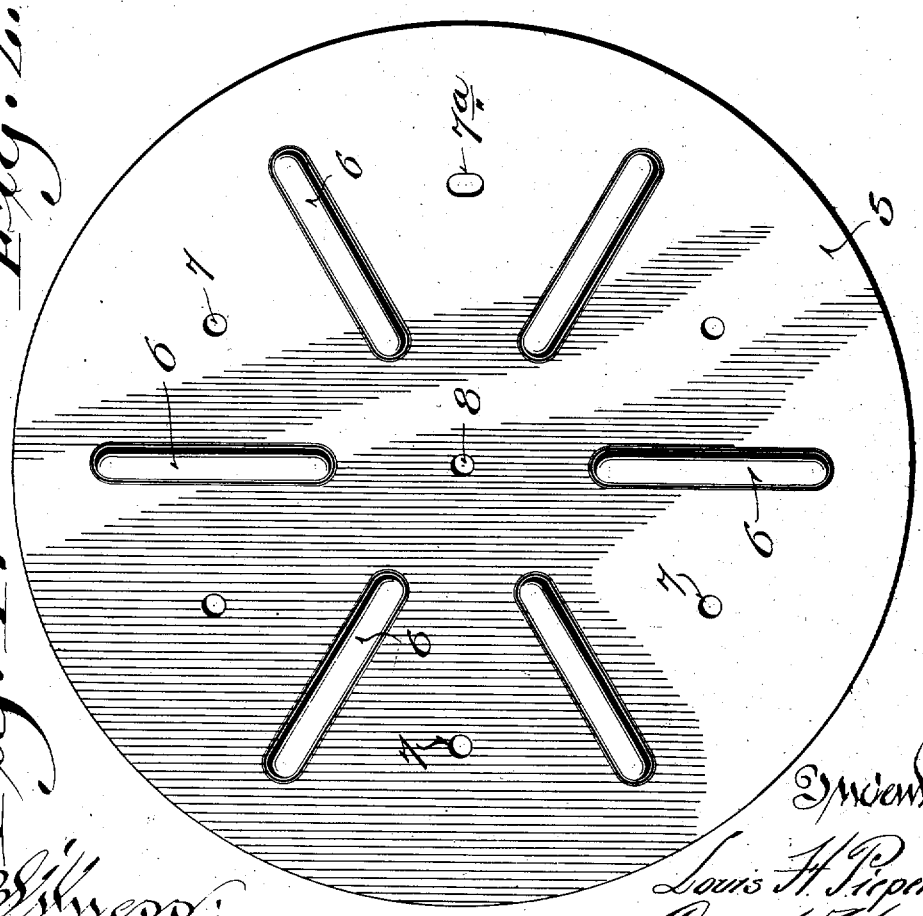

Figure 1 represents a top plan view of a follower constructed according to my invention. Fig. 2 represents a sectional view taken transversely through the meeting end portions of adjacent hoops of a gang press for forming cheese and showing the relation of the follower and hoop bottom.

Referring more particularly to the drawings, the follower comprises a flat disk 5 formed of suitable metal, and provided with a plurality of projections in the form of radially extending equally spaced ridges 6. The ridges are stamped from the metal, and terminate at their ends a short distance from the periphery and the center respectively of the disk. The ridges 6 alternate with perforations or openings 7 provided for the passage of whey. An opening 8 is also provided at the center of the disk for the same purpose. One of the openings 7 as indicated at $7^a$ is lengthened or made oblong whereby the disk may be engaged by a hook or similar implement for removing the follower from the cheese hoop when the cheese has been pressed. The particular number and arrangement of the ridges and openings may be varied with the various sizes and shapes of followers in order to produce the best result in each particular case.

In Fig. 2, 9 indicates the outer portion and 10 the inner portion of a pair of "gang press" hoops of a well-known type. As is usual in the structure of these hoops, the outside diameter of the inner portion 10 is somewhat less than the inside diameter of the outer portion 9, so that an angular space is left between the hoops through which the whey may find its exit. The follower 5 is disposed in the outer portion 9, of one hoop, in the manner indicated, with the ridges or projections 6 extending outwardly. These ribs form a seat for the perforated bottom 11 in the opposite hoop. Said bottom rests and is secured at its periphery against the inwardly extending flange 12 of the outer hoop. It will be noted that the depth of the ribs 6 is somewhat greater than the thickness of the flange 12 so that a space is left between said flange and the disk or follower 5 to allow passage of whey between these parts. As the cheese is being pressed the whey percolates through the openings 7, $7^a$ and 8 of the plate 5 and through the perforations of the bottom 11 and runs out between the disk and flange 12 and between the adjacent portions 10 and 9 of the hoops. It will be noted that almost the entire surface of the disk may be utilized in draining the whey. This is a distinct advantage over the old style followers in which grooves or channels are provided for this drainage, because the grooves or channels oftentimes become congested with whey and grease which block the passages or channels and prevent a through drainage of the whey. The grooves are also very hard to keep in a clean and sanitary condition. The rib 6 while spacing the disk from the bottom 11, forms a good substantial rest for the bottom and will not injure the latter in any way.

Such a follower as I have provided is of an extremely sanitary nature, for the reason that it may be very readily cleaned and because of the thinness of the metal no whey or grease will remain in the drainage openings. This follower will last an extremely long time since it is preferably made of some suitable metal, and is not subject to breakage such as are the old style wooden followers.

Although I have described the preferred embodiment of my invention, I may desire to make such changes in the construction, combination and arrangement of parts thereof as do not depart from the spirit of the invention and the scope of the appended claims. It is obvious that the ribs or projections 6 may be formed in any desired manner on the respective plate, and not necessarily stamped from the plate, although such stamped formation of the ribs is preferable in that it conduces to a strength and lightness of structure.

I claim:

1. A cheese follower comprising a single flat metal plate having a plurality of projections extending from one surface thereof, whereby the entire surface of the plate, exclusive of the projections, may be utilized as a whey drainage, said plate having its flat portion only perforated.

2. A cheese follower comprising a single flat metal plate provided with a plurality of imperforate projections and provided with a plurality of perforations arranged between the projections.

3. The combination with a hoop of a perforated bottom plate for said hoop, a perforated follower plate associated with the bottom plate, and a plurality of projections extending from one of the plates for engaging the juxtaposed face of the other plate to hold said plates spaced to form a drainage chamber between the plates.

4. In a cheese press, the combination with a hoop having an inwardly projecting flange, and a bottom adapted to rest against said flange, of a follower comprising a perforated disk having projections formed on one face thereof to engage the bottom, said projections being of a depth greater than the thickness of said flange.

In testimony that I claim the foregoing as my own, I have hereto affixed my signature in the presence of two witnesses.

LOUIS H. PIEPER.

Witnesses:
M. C. MEAD,
EMMA FOESTE.